United States Patent
Berne et al.

(10) Patent No.: US 11,932,316 B2
(45) Date of Patent: *Mar. 19, 2024

(54) VEHICLE COMPRISING A WIND DEFLECTING ASSEMBLY AND A LIGHTING ASSEMBLY

(71) Applicant: Volvo Truck Corporation, Gothenburg (SE)

(72) Inventors: Nicolas Berne, Heyrieux (FR); Olivier Hermann, Saint-Maurice-sur-Dargoire (FR)

(73) Assignee: Volvo Truck Corporation, Gothenburg (SE)

( * ) Notice: Subject to any disclaimer, the term of this patent is extended or adjusted under 35 U.S.C. 154(b) by 233 days.

This patent is subject to a terminal disclaimer.

(21) Appl. No.: 17/439,067

(22) PCT Filed: Mar. 25, 2019

(86) PCT No.: PCT/EP2019/057447
§ 371 (c)(1),
(2) Date: Sep. 14, 2021

(87) PCT Pub. No.: WO2020/192885
PCT Pub. Date: Oct. 1, 2020

(65) Prior Publication Data
US 2022/0194292 A1  Jun. 23, 2022

(51) Int. Cl.
*B62D 35/00* (2006.01)
*B60Q 1/24* (2006.01)
(Continued)

(52) U.S. Cl.
CPC .......... *B62D 35/001* (2013.01); *B60Q 1/247* (2022.05); *B60Q 1/2661* (2013.01); *B60R 11/04* (2013.01);
(Continued)

(58) Field of Classification Search
CPC ............... B62D 35/001; B62D 15/021; B62D 15/0295; B62D 13/06; B60Q 1/247;
(Continued)

(56) References Cited

U.S. PATENT DOCUMENTS

| 4,135,754 A | 1/1979 | FitzGerald et al. |
| 4,688,845 A * | 8/1987 | Kingsley ............... B62D 33/02 296/99.1 |

(Continued)

FOREIGN PATENT DOCUMENTS

| CN | 108068897 A | 5/2018 |
| CN | 109738166 A * | 5/2019 |

(Continued)

OTHER PUBLICATIONS

Horvath et al. "How Celestial Polarization Changes due to Reflection from the Deflector Panels Used in Deflector Loft and Mirror Experiments Studying Avian Orientation" (Year: 1997).*

(Continued)

*Primary Examiner* — Thien T Mai
(74) *Attorney, Agent, or Firm* — Withrow & Terranova, PLLC

(57) ABSTRACT

The invention relates to a vehicle comprising a chassis which has a longitudinal axis and which is supported by wheels; a cab mounted on the chassis, the cab including two side walls; a wind deflecting assembly comprising at least two side deflector panels, each side deflector panel having a front edge linked to a rear portion of the corresponding cab side wall and a rear edge, and extending vertically over at least part of the height of the corresponding cab side wall rear portion; and at least one lighting assembly which is mounted on a side deflector panel and which includes at least a working lamp configured to illuminate an area located rearward of the cab.

14 Claims, 3 Drawing Sheets

(51) Int. Cl.
*B60Q 1/26* (2006.01)
*B60R 11/04* (2006.01)
*G06T 7/73* (2017.01)
*H04N 7/18* (2006.01)
*B60R 11/00* (2006.01)
*H04N 23/56* (2023.01)

(52) U.S. Cl.
CPC ............... *G06T 7/73* (2017.01); *H04N 7/18* (2013.01); *B60Q 2400/50* (2013.01); *B60R 2011/004* (2013.01); *G06T 2207/30204* (2013.01); *G06T 2207/30252* (2013.01); *H04N 23/56* (2023.01)

(58) Field of Classification Search
CPC .............. B60Q 1/2661; B60Q 2400/50; B60Q 2300/14; B60Q 2300/314; B60Q 2400/40; B60Q 1/085; B60Q 1/0035; B60R 11/04; B60R 2011/004; B60R 1/26; B60R 2300/103; G06T 7/73; G06T 2207/30204; G06T 2207/30252; H04N 7/18; H04N 23/56; G06V 20/56; G06V 30/2247; B60D 1/62
See application file for complete search history.

(56) References Cited

U.S. PATENT DOCUMENTS

| | | | |
|---|---|---|---|
| 6,428,084 B1 | 8/2002 | Liss | |
| 7,455,348 B1 * | 11/2008 | Grover | B62D 35/001 296/180.1 |
| 9,686,481 B1 * | 6/2017 | Graybill | H04N 5/32 |
| 10,793,055 B1 * | 10/2020 | Berne | B62D 35/008 |
| 2009/0040500 A1 * | 2/2009 | Nishiushi | G01S 17/87 356/3.11 |
| 2010/0201152 A1 * | 8/2010 | Smith | B62D 35/001 296/180.3 |
| 2013/0076063 A1 | 3/2013 | Ryan et al. | |
| 2019/0111744 A1 * | 4/2019 | Billich | B60D 1/36 |
| 2019/0152392 A1 * | 5/2019 | DePaschoal | H04N 13/344 |
| 2020/0103269 A1 * | 4/2020 | Bell | G01G 19/086 |
| 2022/0153345 A1 * | 5/2022 | Berne | B62D 13/06 |
| 2022/0194292 A1 * | 6/2022 | Berne | B60Q 1/2661 |

FOREIGN PATENT DOCUMENTS

| | | | |
|---|---|---|---|
| DE | 4119436 A1 | 2/1993 | |
| DE | 102004025252 A1 * | 12/2005 | ............ B60D 1/36 |
| GB | 2497211 A | 12/2012 | |
| JP | H06107035 * | 9/1992 | |
| WO | 2014126511 A1 | 8/2014 | |
| WO | 2016151319 A1 | 9/2016 | |
| WO | 2018215810 A1 | 11/2018 | |

OTHER PUBLICATIONS

Schmieder et al., "Enhancing a Driving Simulator with a 3D-Stereo Projection System" (Year: 2017).*
Ehlgen et al. "Maneuvering_Aid_for_Large_Vehicle_using_Omnidirectional_Cameras" (Year: 2007).*
International Search Report and Written Opinion for International Patent Application No. PCT/EP2019/057447, dated Dec. 12, 2019, 11 pages.
First Office Action for Chinese Patent Application No. 201980093536.3, dated Feb. 7, 2022, 14 pages.

* cited by examiner

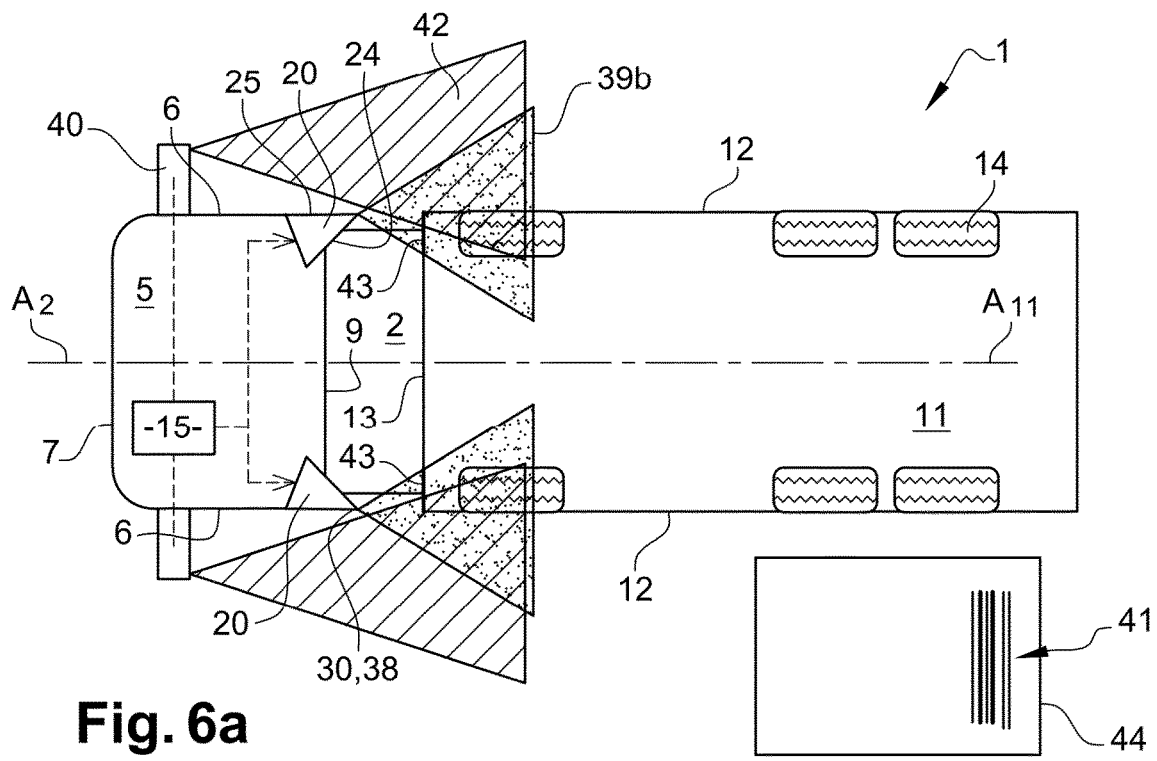
Fig. 6a
Fig. 6b
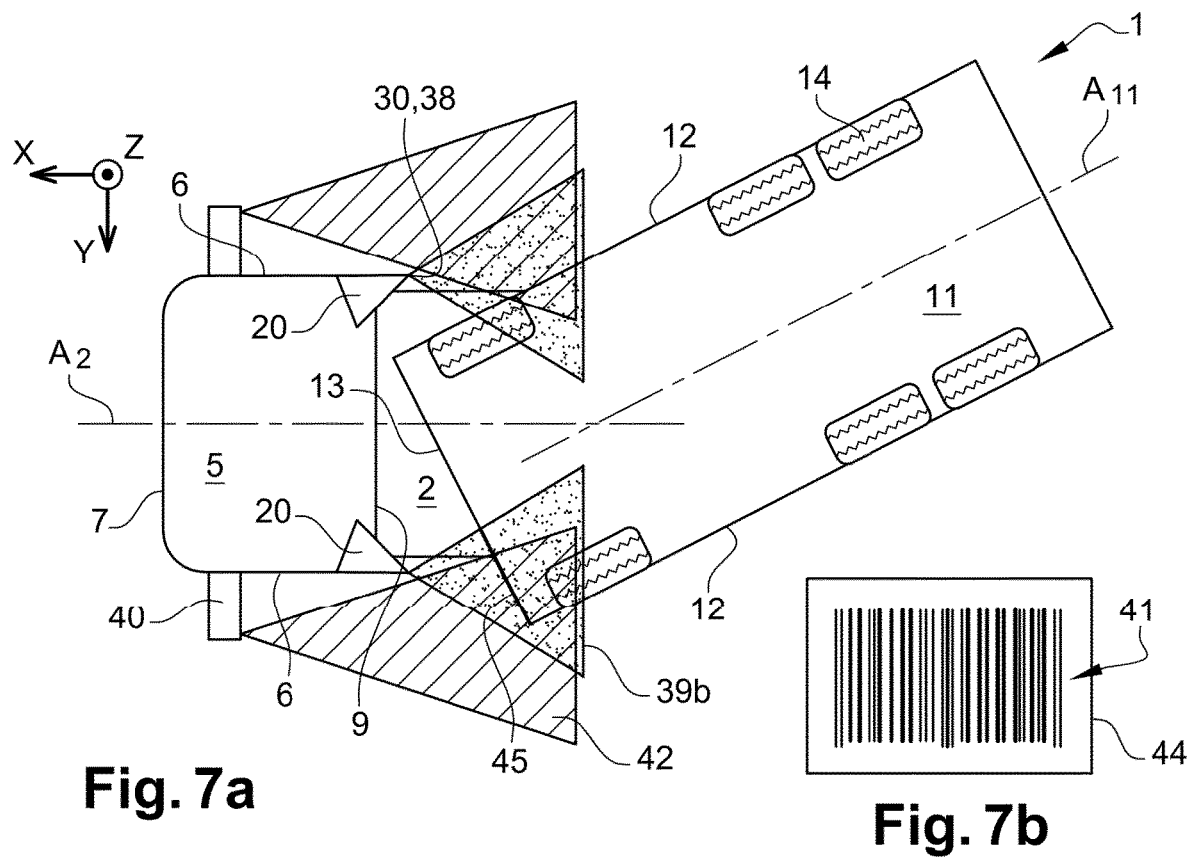
Fig. 7a
Fig. 7b

VEHICLE COMPRISING A WIND DEFLECTING ASSEMBLY AND A LIGHTING ASSEMBLY

This application is a 35 USC 371 national phase filing of International Application No. PCT/EP2019/057447, filed Mar. 25, 2019, the disclosure of which is incorporated herein by reference in its entirety.

TECHNICAL FIELD

The invention relates to a vehicle comprising a lighting assembly and to a method for operating a lighting assembly in such a vehicle.

The invention is used in vehicles including a cab and a trailer that is connected or can be connected to the cab, in particular in heavy-duty vehicles, such as trucks.

BACKGROUND

Vehicles, in particular industrial vehicles such as trucks, can require lighting for some operational phases. For example, for loading/unloading operations in night or dark conditions, lighting the vehicle aperture through which goods have to be loaded/unloaded may be necessary.

Therefore, vehicles can be equipped with a working lamp, i.e. a casing including one or several powerful light source(s) configured to illuminate the desired area, in particular to make some operations easier and safer for a user.

When mounted on the vehicle, the working lamp casing generally forms a protruding member which may be caught in or damaged by surrounding elements. In other words, such an arrangement is not fully satisfactory in terms of robustness and reliability.

Besides, even when the working lamp casing is mounted on the vehicle by means of a movable member, this member might not provide a range of motion wide enough to allow illuminating all areas of potential interest around the vehicle. Moreover, some components of the vehicle may be interposed on the light path and therefore create undesirable dark areas.

In addition, most of the time, such working lamps are not designed to be modular nor evolutionary.

SUMMARY

An object of the invention is to provide a vehicle which is equipped with a working lamp and which solves at least one of the problems of the prior art.

To that end, according to a first aspect, the invention relates to a vehicle comprising:
- a chassis which has a longitudinal axis and which is supported by wheels;
- a cab mounted on the chassis, the cab including two side walls;
- a wind deflecting assembly comprising at least two side deflector panels, each side deflector panel having a front edge linked to a rear portion of the corresponding cab side wall and a rear edge, and extending vertically over at least part of the height of the corresponding cab side wall rear portion;
- at least one lighting assembly which is mounted on a side deflector panel and which includes at least a working lamp configured to illuminate an area located rearward of the cab.

Mounting a working lamp on a side deflector panel brings various significant advantages.

Being mounted on the side deflector panel, the working lamp protrudes relative to the cab outer surface, thereby ensuring a fairly broad area can be illuminated, while also being mechanically protected against damages caused by surrounding elements.

Furthermore, the position of the side deflector panels is such that substantially no vehicle component is located on the emitted light beam between the working lamp and the area to be illuminated, thereby eliminating the creation of dark areas.

Such an arrangement further allows taking advantage of an existing component of the vehicle, namely the side deflector panels, which is a cost effective and mechanically simplified solution.

In practice, the lighting assembly can comprise a casing which includes a fastening system for being mounted on the side deflector panel, and which has an open rear face. A glass can be mounted on the casing for closing the casing open rear face. The casing and glass thus form a housing which receives light sources that emit a beam rearward through the glass. The light sources form at least a working lamp, and possibly other lighting functions.

The vehicle may comprise one lighting assembly on each side deflector panel, the left and right lighting assemblies being preferably identical.

When the vehicle is running, the outer face of each side deflector panel can typically be substantially flush with the corresponding cab side wall, i.e. the side deflector panel outer face defines a mean plane which is substantially vertical and longitudinal or angled slightly outwardly from the side deflector panel front edge to its rear edge, by an angle less than 10°.

The vehicle can be a tractor only, when no trailer is connected to the chassis, or can comprise both a tractor and a trailer connected to the chassis.

By "working lamp" is meant a lamp comprising one or several light source(s) having a high intensity in the visible spectrum, like a projector. Such a working lamp has a lighting function, not only a signaling function—for example a regulatory function—for informing or warning a person outside the vehicle. The light sources can be LEDs.

The working lamp can be configured to emit a light beam providing at least 2 lux, preferably at least 4 lux, in the target area. In an embodiment, the working lamp can be configured to emit a light beam providing more than 5 lux and less than 10 lux in the target area. In an area illuminated by two distinct working lamps having overlapping beams, the luminous flux received may then be above 10 lux. The emission level can change depending on the design of the lighting assembly (presence of a reflector or not, number of light sources, emission specifications of light sources, position of light sources, etc.).

The lighting assembly, and preferably the working lamp, may extend over a height that is at least half the side deflector panel height, wherein, preferably, said lighting assembly/working lamp height is substantially identical to the side deflector panel height. The working lamp can extend over the whole height of the lighting assembly, or only part of it.

The lighting assembly, and preferably the working lamp, may extend over the whole height of the corresponding cab side wall rear portion, and even further upwards, for example if the wing deflecting assembly further comprises a top deflector panel arranged on the cab roof.

In an embodiment, each side deflector panel has an inner face, disposed towards the chassis longitudinal axis, and an outer face, and the lighting assembly is mounted on the inner face of the side deflector panel.

The lighting assembly can be mounted near the rear edge of the side deflector panel.

The side deflector panel can be pivotally mounted relative to the corresponding cab side wall, about a pivoting axis which is substantially coincident with the side deflector panel front edge, between:
- a first position, in which a side deflector panel outer face is substantially flush with the corresponding cab side wall;
- and a second position, in which the side deflector panel outer face defines a mean plane which is substantially vertical and angled outwardly from the side deflector panel front edge to the rear edge thereof.

The first position is an aerodynamic position. The side deflector panel is preferably in said first position when the vehicle is running. By "substantially flush with the corresponding cab side wall" is meant that the side deflector panel outer face defines a mean plane which is substantially vertical and longitudinal or angled slightly outwardly from its front edge to its rear edge, by an angle less than 10°.

As in the second position the side deflector panels protrude outwardly from the cab outer envelope, this second position is preferably not used when the vehicle is running, but rather when the vehicle is stopped, for various operations, as described later. For example, said mean plane defined by the side deflector panel outer face can form with the vertical longitudinal plane an angle of at least 40°, preferably at least 60°, and more preferably at least 90°.

According to an embodiment, the lighting assembly is configured and mounted on the side deflector panel such that:
- in the first position, the working lamp can emit a light beam towards a trailer connector arranged on the chassis;
- and/or, in the second position, the working lamp can emit a light beam substantially along a chassis corresponding side wall.

The lighting assembly may be configured and mounted on the side deflector panel such that, when projected on a horizontal plane:
- in the first position, a working lamp main optical axis is directed towards the longitudinal axis of the chassis and is angled relative to said longitudinal axis by an angle ($\alpha$) which is comprised between 30° and 60°, preferably between 40° and 50°;
- and/or, in the second position, a working lamp main optical axis is angled relative to the longitudinal axis of the chassis by an angle ($\beta$) which is comprised between −10° and +10°, preferably between −5° and +5°.

According to another embodiment, the lighting assembly is configured and mounted on the side deflector panel such that, when the side deflector panel is in a position in which its outer face is substantially flush with the corresponding cab side wall, the working lamp can emit a light beam substantially along a chassis corresponding side wall. Such a position corresponds to the above mentioned "first position", but the side deflector panel is not necessarily configured to pivot towards a second position.

The term "along" means that the light beam is capable of illuminating an area rearward of the cab, including the chassis side wall and nearby lateral areas.

The lighting assembly can be configured and mounted on the side deflector panel such that, when the side deflector panel is in a position in which its outer face is substantially flush with the corresponding cab side wall, a working lamp main optical axis, when projected on a horizontal plane, is angled relative to the longitudinal axis of the chassis by an angle ($\gamma$) which is comprised between −10° and +10°, preferably between −5° and +5°.

The vehicle may further comprise a camera monitoring system (CMS) which includes a camera arranged on a supporting arm mounted on the cab, for providing a captured image of an area located rearward of the cab.

With such an arrangement, the lighting assembly can further include at least one IR emitting light source, such as a LED. This allows improving the CMS performance in night conditions.

Alternatively, or in addition, the lighting assembly can further include at least one light source configured to project a picture rearward of the cab, the picture forming a mark on a functional face located rearward of the cab, said mark being detectable by the camera. The functional face can be at least part of a front face of a trailer pivotally connected to the chassis; the mark can typically be representative of an angle between the trailer longitudinal axis and the chassis longitudinal axis. This makes it possible to determine the trailer angle relative to the chassis longitudinal axis. In particular, in a possible embodiment, the marks are vertical lines—or other visual elements—the number of which can be determined by the camera monitoring system, thereby allowing determining said angle.

Alternatively, or in addition, the lighting assembly can further include at least one lamp having a signaling function.

According to a second aspect, the invention relates to a method for operating a lighting assembly in a vehicle as previously described, wherein the lighting assembly includes, in addition to a working lamp, at least one additional light source among IR emitting light source(s) and light source(s) used to form a camera detectable mark on a functional face located rearward of the cab. The method comprises:
- determining at least one selection parameter among:
  - a configuration of the vehicle, such as whether a trailer is connected to the chassis or not;
  - an operating condition of the vehicle, such as whether the vehicle is running or stopped, in a trailer loading/unloading phase or not;
  - a surrounding condition, such as the ambient light;
- depending on said determined selection parameter, activate automatically or through manual control at least one among the working lamp and the at least one additional light source.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 6a is a schematic top view of a vehicle according to still another embodiment of the invention, the trailer of the vehicle being parallel to the chassis longitudinal axis;

FIG. 6b shows an image captured by a camera of the vehicle in the position of FIG. 6a;

FIGS. 7a and 7b are respectively similar to FIGS. 6a and 6b, the trailer of the vehicle being angled relative to the chassis longitudinal axis.

DETAILED DESCRIPTION OF EXAMPLE EMBODIMENTS OF THE INVENTION

Figure 1:
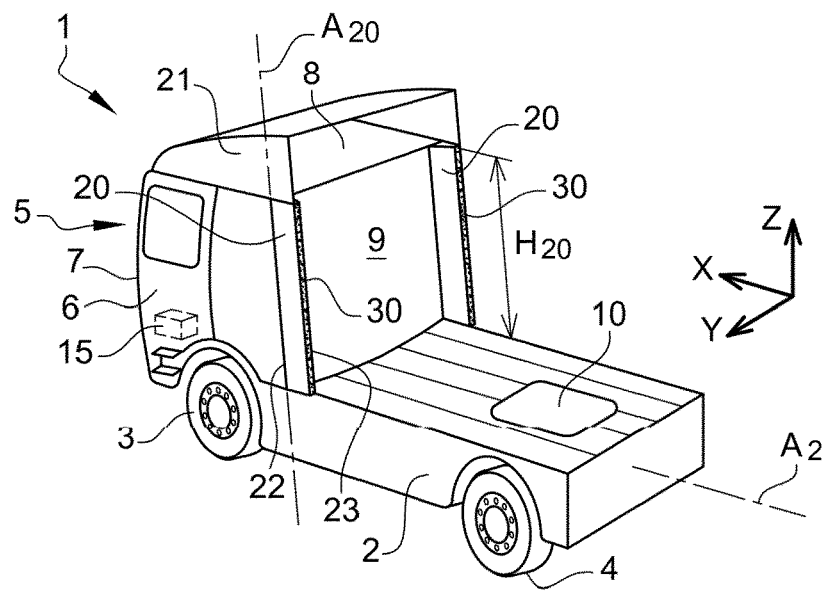
FIG. 1 is a schematic perspective rear view of a vehicle according to the invention, comprising a chassis and a cab, but no trailer connected to the chassis, the vehicle including side deflector panels and a lighting assembly mounted on each side deflector panel.

A vehicle 1, as shown in FIG. 1, comprises a chassis 2 supported by wheels, namely front wheels 3 and rear wheels 4. A cab 5 defining a driver's compartment is mounted on the chassis 2, on the front. The cab 5 has two side walls 6, a front wall 7, a top wall 8 and a rear wall 9. The chassis 2 can further comprise a trailer connector 10 located rearward of the cab 5. The vehicle 1 can therefore include a trailer 11 mechanically and electrically connected to the chassis 2 (as in FIG. 4 for example), or no trailer connected to the chassis 2, the vehicle 1 thus being only a tractor (as in FIGS. 1 and 3). The trailer 11 has side walls 12 and a front wall 13. The trailer 11 further has rear wheels 14. The trailer 11 can be pivotally connected to the chassis 2.

Z is defined as the vertical direction, X is defined as the longitudinal direction of the vehicle 1, and Y is defined as the transversal direction of the vehicle 1. The chassis 2 has a longitudinal axis A2, and the trailer 11 has a longitudinal axis A11.

The vehicle 1 may comprise an electrical control unit (ECU) 15 for controlling the various electric systems of the vehicle 1.

The vehicle 1 also comprises a wind deflecting assembly for improving aerodynamics. The wind deflecting assembly comprises two side deflector panels 20, and can further comprise a top deflector panel 21 arranged on the cab top wall 8.

Each side deflector panel 20 has a front edge 22 linked to a rear portion of the corresponding cab side wall 6 and a rear edge 23, and extends vertically over a height H20 that is at least part of the height of the corresponding cab side wall rear portion. In the exemplary embodiment illustrated in FIG. 1, the height H20 of the side deflector panel 20 is substantially identical to the height of the cab 5. In other embodiments, the side deflector panels 20 could extend further upwards beyond the cab top wall 8. Each side deflector panel 20 has an inner face 24, disposed towards the chassis longitudinal axis 2, and an outer face 25 along which air flows when the vehicle 1 is in motion.

Each side deflector panel 20 may be pivotally mounted relative to the corresponding cab side wall 6, about a pivoting axis A20 which is substantially coincident with the side deflector panel front edge 22. Thus, the side deflector panel 20 may pivot between:
 a first position (FIGS. 1, 3, 5, 6a and 7a), in which a side deflector panel outer face 25 is substantially flush with the corresponding cab side wall 6;
 and a second position (FIG. 4), in which the side deflector panel outer face 25 defines a mean plane P25 which is substantially vertical and angled outwardly from the side deflector panel front edge 22 to the rear edge 23 thereof.

The vehicle 1 further comprises at least one lighting assembly 30 which is mounted on a side deflector panel 20. The vehicle 1 may typically comprise two lighting assemblies 30, preferably identical, one lighting assembly 30 being mounted on each side deflector panel 20.

Figure 2:
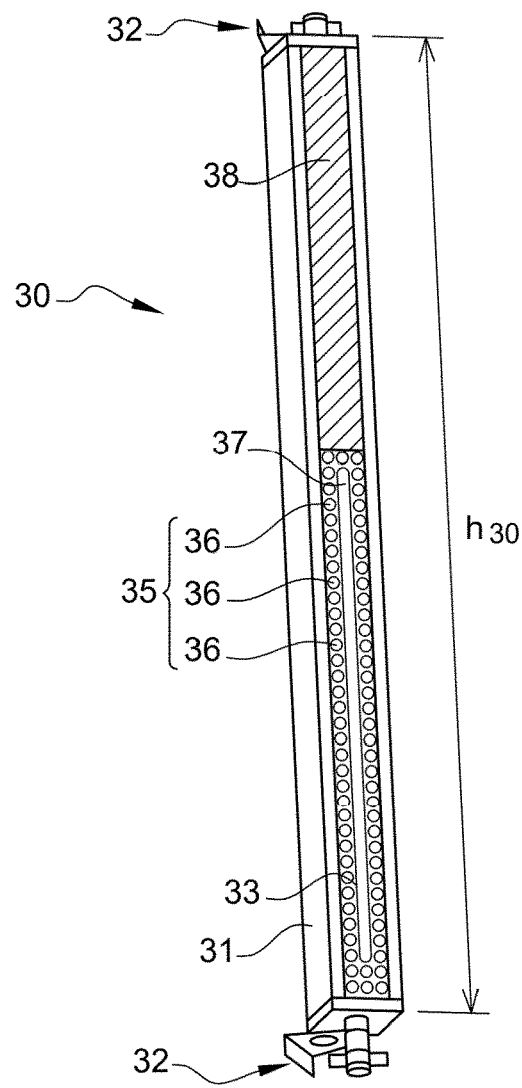
FIG. 2 is a perspective view of a lighting assembly to be mounted on the vehicle.

As shown in FIG. 2, the lighting assembly 30 can comprise a casing 31 which includes a fastening system 32 for being mounted on the side deflector panel 20 and which has an open rear face. A glass 33 can be mounted on the casing 31 for closing the casing open rear face. The casing 31 and glass 33 thus form a housing which receives light sources that emit a beam rearward through the glass 33. The or some of the light sources can comprise LEDs. The lighting assembly 30 may include other components such as an optical deflector.

The lighting assembly 30 can be mounted on the inner face 24 of the side deflector panel 20. It can be mounted near the rear edge 23 of the side deflector panel 20.

The lighting assembly 30 includes at least a working lamp 35. The working lamp 35 comprises one or several light source(s) 36 having a high intensity in the visible spectrum, and is configured to illuminate an area located rearward of the cab 5. The working lamp 35 emits a light beam 39 and has a main optical axis A35.

The lighting assembly 30 may provide other lighting functions. In particular, the lighting assembly 30 may further includes:
 one or several IR emitting light source(s) 37;
 and/or one or several light source(s) 38 used to form a mark on a functional face located rearward of the cab 5, as will be described later.

It has to be noted that the arrangement of light sources 36, 37, 38 performing various lighting functions, as illustrated in FIG. 2, is only an exemplary embodiment that should not be considered as limitative.

The lighting assembly 30 has a height h30 that is at least 50%, preferably at least 70%, more preferably at least 80%, of the side deflector panel height H20. In the exemplary embodiment illustrated in FIG. 1, the lighting assembly height h30 is substantially identical to the side deflector panel height H20. The working lamp 35 can extend over the whole height h30 of the lighting assembly 30, or only part of it (as in FIG. 2).

Figure 5:
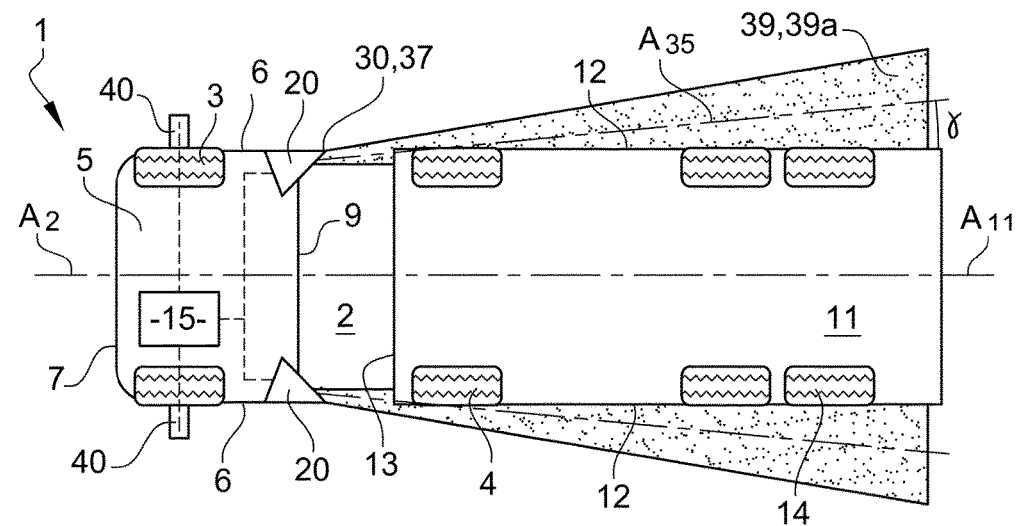
FIG. 5 is a schematic top view of a vehicle according to another embodiment of the invention.

As in FIGS. 5, 6a and 7a, the vehicle 1 may also comprise a camera assembly 40 mounted on the cab 5, typically on a front top portion of at least one side wall 6 of the cab 5, adjacent the driver's seat. Basically, the camera assembly 40 comprises a supporting arm and a camera arranged on said supporting arm, for providing a captured image of an area surrounding the vehicle 1, more specifically an area located rearwards and along a vehicle side. The supporting arm can be fixedly mounted on the cab 5, and can be equipped with a mechanism (not shown) allowing the camera assembly 40 to be:
 either in a parking position (not shown), when not in use (typically when the vehicle 1 is stopped), in which the camera assembly 40 is folded against the cab side wall 6 to prevent damages;
 or in a use position, in which the camera assembly 40 is protruding from the cab side wall 6, to allow the camera to capture images (FIGS. 5, 6a and 7a).

Such a camera assembly 40 can typically be part of a so-called camera monitoring system (CMS) which further includes a monitor inside the driver's compartment for displaying an image based on the captured image provided by the camera. The camera monitoring system also includes a controller which can be connected to the ECU 15.

Figure 3:
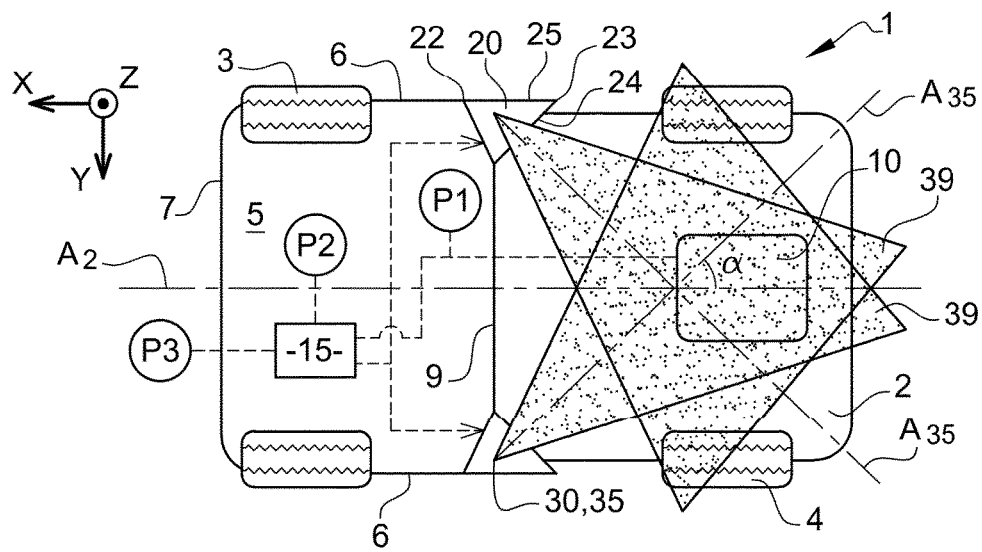
FIG. 3 is a schematic top view of a vehicle according to an embodiment of the invention, with the side deflector panels in a first position.
Figure 4:
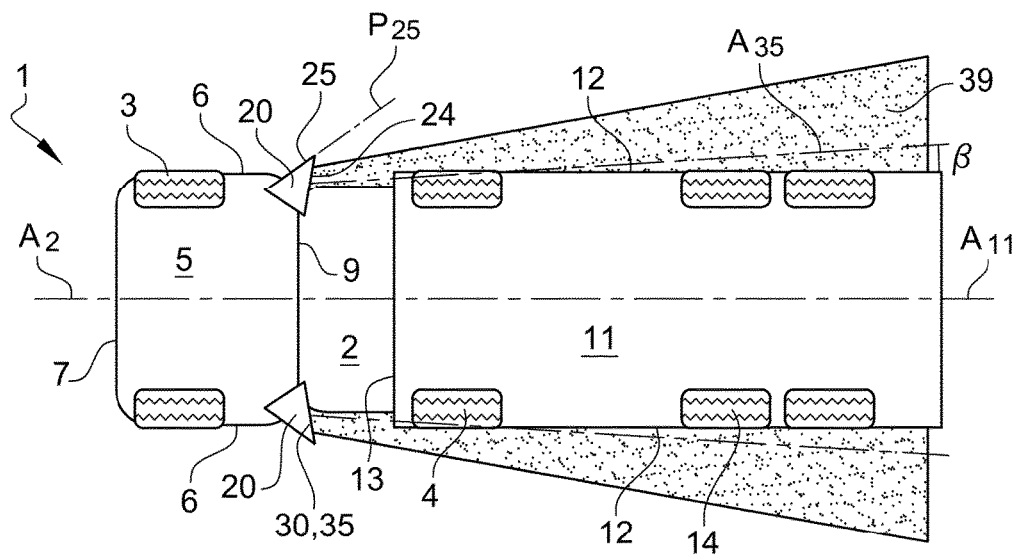
FIG. 4 is a view similar to FIG. 3, the vehicle including a trailer connected to the chassis and the side deflector panels being in a second position.

Reference is now made to FIGS. 3 and 4 which show one embodiment of the invention.

In this embodiment, the lighting assembly 30 can be configured and mounted on the side deflector panel such that, in the first position (FIG. 3), the working lamp 35 can emit a light beam 39 towards the trailer connector 10. In other words, in a horizontal plane (X,Y), the working lamp main optical axis A35 is directed towards the longitudinal axis A2 of the chassis 2 and is angled relative to said longitudinal axis A2 by an angle α which is comprised between 30° and 60°, preferably 40° and 50°. This configuration is of particular interest when the vehicle 1 does not include a trailer 11 but when such a trailer 11 is to be connected to the chassis 2, with the vehicle 1 being stopped, specifically in a dark environment (in night conditions or in a place where ambient light is low).

The lighting assembly 30 can be configured and mounted on the side deflector panel such that, in the second position (FIG. 4), the working lamp 35 can emit a light beam 39 substantially along a chassis corresponding side wall. In other words, in a horizontal plane (X,Y), the working lamp main optical axis A35 is angled relative to the longitudinal axis A2 of the chassis 2 by an angle β which is comprised between −10° and +10°, preferably between −5° and +5°. This configuration is of particular interest when the vehicle 1 is stopped and when the trailer 11—connected to the chassis 2—is to be loaded/unloaded through a side aperture, specifically in a dark environment. Then, the working lamp 35 illuminates the trailer side walls 12 and makes loading/unloading easier and safer.

Reference is now made to FIG. 5 which shows another embodiment of the invention.

In this embodiment, the lighting assembly 30 is configured and mounted on the side deflector panel 20 is in the first position, the working lamp 35 can emit a light beam 39 substantially along a chassis corresponding side wall. In other words, in a horizontal plane (X,Y), the working lamp main optical axis A35 is angled relative to the longitudinal axis A2 of the chassis 2 by an angle γ which is comprised between −10° and +10°, preferably between −5° and +5°. This configuration makes loading/unloading easier and safer as previously explained.

In this embodiment, the side deflector panel 20 is not necessarily configured to pivot towards the above described second position.

Besides, owing to this arrangement, with the vehicle 1 comprising a camera assembly 40 and the lighting assembly 30 including one or several IR emitting light source(s) 37 configured to emit a light beam 39*a* substantially along a chassis corresponding side wall in the first position of the side deflector panel 20, the invention makes it possible to improve the camera assembly operation in night or dark conditions, specifically when the vehicle 1 is in motion. The captured image, and ultimately the image displayed on the driver's monitor, are more contrasted and/or include more visible details, which allows improving safety.

Reference is now made to FIGS. 6*a*-7*b* which concern still another embodiment of the invention.

According to this embodiment, the vehicle 1 comprises a camera assembly 40 and the lighting assembly 30 includes one or several light source(s) 38 which, in the first position of the side deflector panel 20, are configured to emit a light beam 39*b* and to project a picture forming a mark 41 on a functional face located rearward of the cab 5. The functional face can be at least part of the front face 13 of the trailer 11, which can be a reflexive surface. The mark 41 or its reflection is detectable by the camera. The mark 41 may consist of a set of vertical lines.

In this embodiment, the side deflector panel 20 is not necessarily configured to pivot towards the above described second position.

When the trailer longitudinal axis A11 is substantially coincident with the chassis longitudinal axis A2, as shown in FIG. 6*a*, the field of vision 42 of each camera includes a corresponding small lateral end portion 43 of the trailer front face 13. As a result, as shown in FIG. 6*b*, the captured image 44 captured by each camera includes only a small portion of the mark 41.

When the vehicle 1 is turning, the trailer longitudinal axis A11 is angled relative to the chassis longitudinal axis A2, as shown in FIG. 7*a*. Then, the field of vision 42 of one camera includes a corresponding lateral end portion 45 of the trailer front face 13 that is wider than the small lateral end portion 43 of the straight configuration of FIG. 6*a*. As a result, as shown in FIG. 7*b*, the captured image 44 captured by said camera includes a larger portion of the mark 41.

This arrangement makes it possible to determine the angle between the trailer longitudinal axis A11 and the chassis longitudinal axis A2, for example by counting the lines in the captured image 44 by means of the camera assembly 40. This angle value can be used to improve several functions of the vehicle 1.

In practice, the lighting assembly 30 may include, in addition to a working lamp 35 comprising one or several light source(s) 36, at least one additional light source among IR emitting light source(s) 37 and light source(s) 38 used to form a camera detectable mark 41 on a functional face 13 located rearward of the cab 5.

Then, all light source(s) 36, 37, 38 are not necessarily activated at a given moment, as their functions are different.

The invention therefore provides a method for operating the lighting assembly 30 of the vehicle 1.

The method first comprises determining at least one selection parameter among:

P1: a configuration of the vehicle 1, such as whether a trailer 11 is connected to the chassis 2 or not;

P2: an operating condition of the vehicle 1, such as whether the vehicle 1 is running or stopped, in a trailer loading/unloading phase or not;

P3: a surrounding condition, such as the ambient light (night conditions or day conditions, brightness).

Then, depending on said determined selection parameter P1, P2, P3, the method comprising activating at least one of the light source(s) 36, 37, 38. This activation may be automatically controlled by the electrical control unit 15 or manually controlled through a control device that can be operated by the driver (not shown), following a corresponding informing or warning signal.

For example, when the vehicle 1 is in motion, an appropriate sensor can determine that the ambient light is too low and trigger the activation of the IR light source(s) 37.

According to another example, when the vehicle 1 is stopped, an appropriate sensor may detect that the side aperture of the trailer 11 is open, meaning that the vehicle 1 is in the loading/unloading configuration. As a result, the light source(s) 36 of the working lamp 35 may be activated.

The invention therefore provides a cost effective solution, insofar as one and the same lighting assembly can perform the appropriate one of several lighting functions.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
   a chassis which has a longitudinal axis and which is supported by wheels;
   a cab mounted on the chassis, the cab including two side walls;
   a wind deflecting assembly comprising at least two side deflector panels, each side deflector panel having a front edge linked to a rear portion of a corresponding cab side wall and a rear edge, and extending vertically over at least part of a height of the corresponding cab side wall rear portion;
   at least one lighting assembly mounted on a side deflector panel and including at least a working lamp configured to illuminate an area located rearward of the cab; and
   a camera monitoring system which includes a camera arranged on a supporting arm mounted on the cab, for providing a captured image of an area located rearward of the cab, wherein the at least one lighting assembly further includes at least one light source configured to project a picture rearward of the cab, the picture forming a mark on a functional face located rearward of the cab, the mark being detectable by the camera.

2. The vehicle of claim 1, wherein the working lamp is configured to emit a light beam providing at least 2 lux in a target area.

3. The vehicle of claim 1, wherein the at least one lighting assembly, extends over a height that is at least half a side deflector panel height.

4. The vehicle of claim 1, wherein each side deflector panel has an inner face, disposed towards the chassis longitudinal axis, and an outer face, and wherein, for at least one side deflector panel, the at least one lighting assembly is mounted on the inner face of the side deflector panel.

5. The vehicle of claim 1, wherein, for at least one side deflector panel, the at least one lighting assembly is mounted near the rear edge of the side deflector panel.

6. The vehicle of claim 1, wherein each side deflector panel is pivotally mounted relative to the corresponding cab side wall, about a pivoting axis which is substantially coincident with the side deflector panel front edge, between:
   a first position, in which a side deflector panel outer face is substantially flush with the corresponding cab side wall; and
   a second position, in which the side deflector panel outer face defines a mean plane which is substantially vertical and angled outwardly from the side deflector panel front edge to the rear edge thereof.

7. The vehicle of claim 6, wherein the at least one lighting assembly is configured and mounted on at least one side deflector panel such that:
   in the first position, the working lamp is configured to emit a light beam towards a trailer connector arranged on the chassis;
   and/or, in the second position, the working lamp is configured to emit a light beam substantially along a chassis corresponding side wall.

8. The vehicle of claim 6, wherein the at least one lighting assembly is configured and mounted on at least one side deflector panel such that, when projected on a horizontal plane:
   in the first position, a working lamp main optical axis is directed towards the longitudinal axis of the chassis and is angled relative to the longitudinal axis by an angle which is comprised between 30° and 60°;
   and/or, in the second position, a working lamp main optical axis is angled relative to the longitudinal axis of the chassis by an angle which is between −10° and +10°.

9. The vehicle of claim 1, wherein the at least one lighting assembly is configured and mounted on at least one side deflector panel such that, when the side deflector panel is in a position in which its outer face is substantially flush with the corresponding cab side wall, the working lamp is configured to emit a light beam substantially along a chassis corresponding side wall.

10. The vehicle of claim 1, wherein the at least one lighting assembly is configured and mounted on at least one side deflector panel such that, when the side deflector panel is in a position in which its outer face is substantially flush with the corresponding cab side wall, a working lamp main optical axis, when projected on a horizontal plane, is angled relative to the longitudinal axis of the chassis by an angle which is between −10° and +10°.

11. The vehicle of claim 1, wherein the lighting assembly further includes at least one infrared emitting light source.

12. The vehicle of claim 1, further comprising a trailer connected to the chassis.

13. The vehicle of claim 12, wherein the functional face is at least part of a front face of the trailer.

14. A method for operating a lighting assembly in a vehicle comprising a chassis having a longitudinal axis and being supported by wheels, a cab mounted on the chassis and including two side walls, a wind deflecting assembly comprising at least two side deflector panels each having a front edge linked to a rear portion of a corresponding cab side wall and having a rear edge extending vertically over at least part of a height of the corresponding cab side wall rear portion, and at least one lighting assembly mounted on a side deflector panel and including at least a working lamp configured to illuminate an area located rearward of the cab, the method comprising:
   determining at least one selection parameter among:
      a configuration of a vehicle;
      an operating condition of the vehicle; and
      a surrounding condition; and
   depending on the determined selection parameter, activating automatically or through manual control at least one of a working lamp of a lighting assembly and at least one additional light source of the lighting assembly, the at least one additional light source among infrared emitting light sources and light sources used to form a camera detectable mark on a functional face located rearward of the cab of the vehicle.

* * * * *